US005632039A

United States Patent [19]
Walker et al.

[11] Patent Number: 5,632,039
[45] Date of Patent: May 20, 1997

[54] CIRCUIT THAT AUTOMATICALLY SWITCHES BETWEEN SUPPLYING A MICROPROCESSOR WITH A FIRST VOLTAGE AND A SECOND VOLTAGE

[75] Inventors: Richard E. Walker, The Woodlands; Kurtis J. Bowman, Cypress, both of Tex.

[73] Assignee: Compaq Computer Corporation, Houston, Tex.

[21] Appl. No.: 377,151

[22] Filed: Jan. 24, 1995

[51] Int. Cl.⁶ .................................................. G06F 1/26
[52] U.S. Cl. ................................................ 395/750; 326/68
[58] Field of Search ......................... 395/750; 364/492, 364/707; 323/304, 313, 314, 909; 326/68

[56] References Cited

U.S. PATENT DOCUMENTS

| | | | |
|---|---|---|---|
| 4,992,970 | 2/1991 | Igarashi | 395/750 X |
| 5,184,059 | 2/1993 | Patino et al. | 320/15 |
| 5,283,762 | 2/1994 | Fujishima | 365/189.09 |
| 5,355,073 | 10/1994 | Nguyen | 320/15 |
| 5,384,692 | 1/1995 | Jaff | 361/807 |
| 5,421,734 | 6/1995 | MacWilliams | 439/59 |
| 5,422,523 | 6/1995 | Roberts et al. | 326/68 |

OTHER PUBLICATIONS

Press Release, "Intel Unveils Pentium Overdrive CPU", Jan. 23, 1995, Intel Corp.
IntelDX4™ Processor Data Book, Feb. 1994, pp. 1–15, 7–10, 7–11, Intel Corporation.

*Primary Examiner*—Glenn A. Auve
*Attorney, Agent, or Firm*—Pravel, Hewitt, Kimball & Krieger

[57] ABSTRACT

A circuit that automatically switches the power supply voltage PVDD provided to a CPU between 3.3 volts and 5 volts. The circuit detects whether the CPU installed in a socket is a 3.3-volt part or a 5-volt part by determining the state of a voltage detect sense pin provided by the socket. If the voltage detect sense pin is driven low, that indicates a 3.3-volt CPU is being used. If a 5-volt CPU is installed, the voltage detect sense pin is left floating by the CPU, which allows a pullup resistor to pull the voltage detect sense pin high. The power supply voltage provided to the CPU is regulated through a power field effect transistor (FET). The gate of the power FET is connected to the output of a voltage reference source and is coupled to a 12-volt supply signal. If the voltage detect sense pin is pulled high, the voltage reference source is turned off, allowing the 12-volt supply signal to drive the gate of the power FET. This in turn allows the power FET to pass a 5-volt supply signal to the CPU supply signal PVDD. If the voltage detect sense pin is pulled low, the voltage reference source is turned on to drive the gate of the power FET to approximately one threshold voltage above 3.3 volts. In response, the power FET passes only 3.3 volts to the CPU supply signal PVDD.

18 Claims, 2 Drawing Sheets

CIRCUIT THAT AUTOMATICALLY SWITCHES BETWEEN SUPPLYING A MICROPROCESSOR WITH A FIRST VOLTAGE AND A SECOND VOLTAGE

BACKGROUND OF THE INVENTION

1. Field of the invention

The invention relates to controlling a power supply voltage provided to a microprocessor, and more particularly, to a circuit that automatically switches between supplying the microprocessor with a first voltage or a second voltage.

2. Description of the Related Art

Over the past decade, the performance and speed of microprocessors have improved dramatically. The number of transistors that can be fitted onto a microprocessor chip number is in the millions. Such densities are allowed primarily with the use of complementary metal oxide silicon (CMOS) technology, which allows for significantly lower power consumption over prior bipolar and NMOS technologies. However, even with the use of CMOS technology, power dissipation by today's high performance microprocessors is a significant problem. To reduce power consumption, microprocessors such as the 486SL and Pentium® CPUs from Intel Corporation include built-in power management functions. The energy efficient CPUs include a stop clock and auto halt mode. In stop clock mode, the clock speed of the microprocessor can be reduced or even stopped altogether, which reduces the power dissipation of the microprocessor when it is idle. The CPU enters into the auto halt mode after execution of a halt instruction. This allows the microprocessor to be placed into low power mode via software.

Neither of the above features, however, address how the power consumption of a microprocessor can be reduced while it is active. One popular method of reducing power consumption while the microprocessor is running is to reduce its power supply voltage from the industry standard 5 volts down to 3.3 volts. Lower voltages have also proved to be necessary as die sizes continue to shrink. The small dimensions that exist on a chip require a lower operating voltage to avoid problems associated with high current densities. With the trend towards 3.3 volt microprocessors chip manufacturers have had to provide both microprocessors that operate at 5 volts and 3.3 volts.

This presents the computer manufacturers with a problem, however, as the computer system must be capable of providing two different power supply voltages to the microprocessor. One solution is to include a 5-volt power supply voltage on all computer systems, adding a conventional regulator for providing a 3.3 volt power supply voltage in the 3.3-volt computer systems. However, this requires that the manufacturing process be different for 3.3-volt and 5-volt computer systems. Single-part solutions exist where the same part can be used with both 3.3-volt and 5-volt microprocessors. However, these parts include linear regulators, which are relatively expensive components. Thus the use of the separate, conventional linear regulator is undesirable, as it adds cost to the manufacture of the computer systems for several reasons.

SUMMARY OF THE PRESENT INVENTION

It is an object of the present invention to provide a low-cost power supply control circuit that can be used with microprocessors that operate at either a first or second supply voltage. The power supply control circuit according to the present invention includes regulator circuitry that selectively provides a microprocessor supply voltage at a first voltage or a second voltage, those voltages preferably being 3.3 volts and 5 volts, respectively. The computer system preferably includes a socket for receiving a microprocessor, and the socket includes a pin referred to as the voltage detect sense pin. Microprocessors operating at 3.3 volts drive the voltage detect sense pin low, whereas 5-volt microprocessors leave the voltage detect sense pin floating, allowing a pullup resistor to pull the pin high. The voltage detect sense pin from the microprocessor socket is connected to the regulator circuitry in the power supply control circuit. The regulator circuitry includes a power field effect transistor (FET), whose drain is preferably connected to a 5-volt source, and whose source provides the power supply voltage to the microprocessor. The gate of the power FET 200 in the preferred embodiment is connected to a voltage reference source, which drives the gate of the power FET to approximately 12 volts if the voltage detect sense pin is pulled high by the pullup resistor, and which drives the gate to one threshold voltage of the power FET above 3.3 volts if the sense pin is driven low. Thus, if the voltage detect sense pin is pulled low, the power FET drives the microprocessor supply voltage to 3.3 volts. Otherwise, if the voltage detect sense pin is pulled high, the power FET is completely turned on and allows the 5-volt voltage to pass to the microprocessor supply voltage.

BRIEF DESCRIPTION OF THE DRAWINGS

A better understanding of the present invention can be obtained when the following detailed description of 5 the preferred embodiment is considered in conjunction with the following drawings, in which.

DETAILED DESCRIPTION OF THE PREFERRED EMBODIMENT

Figure 1:
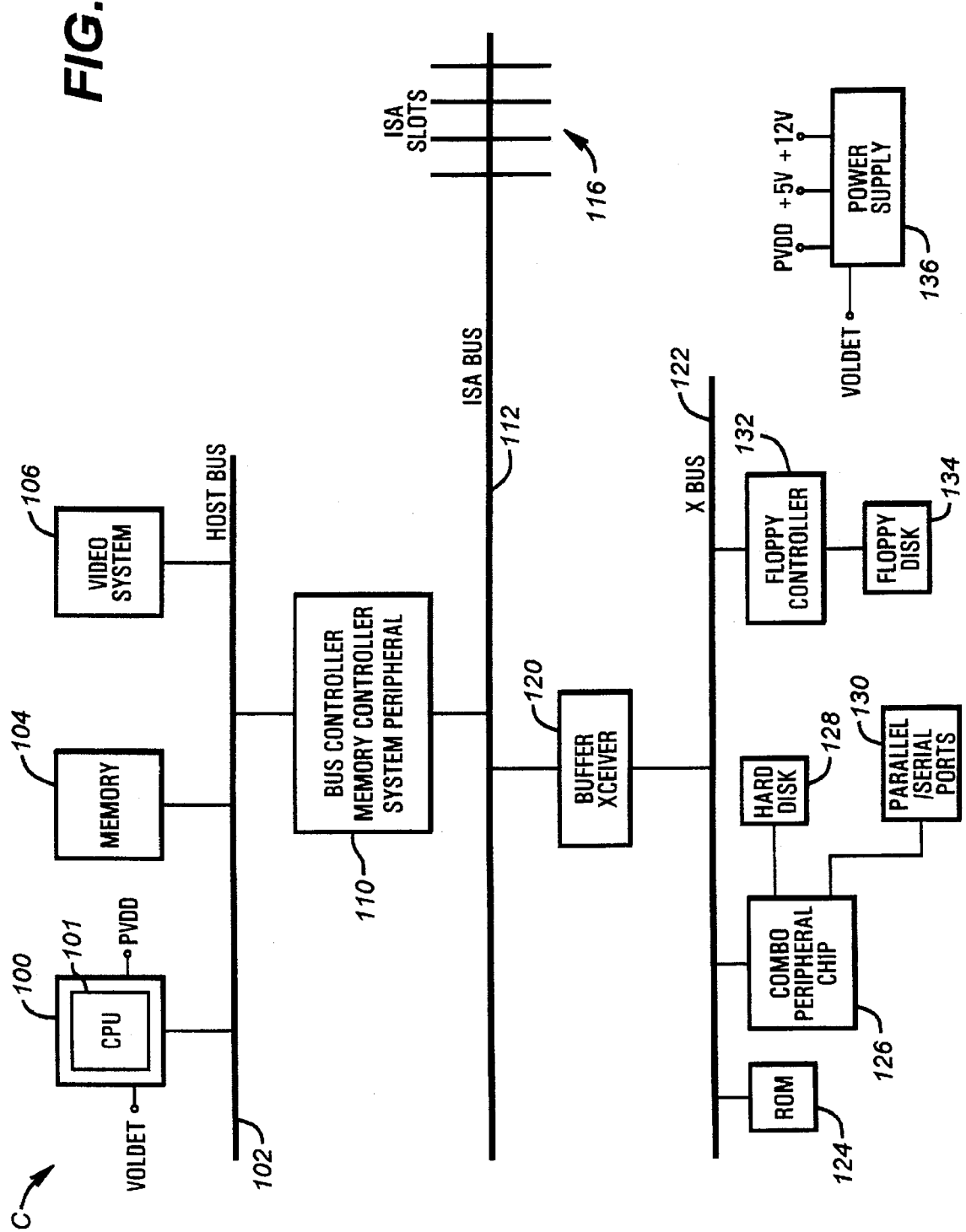
FIG. 1 is an exemplary computer system incorporating the power supply control circuit according to the present invention.

Referring now to FIG. 1, an exemplary computer system C incorporating a power supply control circuit according to the present invention is shown. The computer system C includes a socket 100 for receiving a host CPU or processor 101, which is conventionally a microprocessor such as a 486 or Pentium® processor from Intel Corporation. It is contemplated that instead of using the socket 100, the CPU 101 can be directly soldered to the motherboard. The type of microprocessors that can be used with the computer system C include the 486SX, 486DX, 486DX2, 487SX, 486DX4, and Pentium® P24T processors. In addition, microprocessors from other manufacturers compatible with the 486 processor can also be used. The 486SX, 486DX, 486DX2, and P24T processors operate at 5 volts, while the 486DX4 operates at 3.3 volts. Certain of the microprocessors from the other manufacturers also operate at 3.3 volts. The socket 100 receives a pin or plurality of pins PVDD, which is the microprocessor power supply pin or pins driven to 5 volts or 3.3 volts, depending on which microprocessor is used. The socket 100 also includes a voltage detect sense pin VOLDET. When a 3.3-volt microprocessor is inserted into the socket 100, the microprocessor drives the pin VOLDET low. If a 5-volt microprocessor is inserted, the pin VOLDET is left floating.

A host bus 102 is connected to the CPU 101 to act as a first bus in the computer system C. A main memory system 104 is also connected to the host bus 102 to act as the main memory of the computer system C. A video system 106 is further connected to the host bus 102 to allow for a high performance video system.

A controller 110 is connected between the host bus 102 and an ISA or Industry Standard Architecture bus 112. The controller 110 includes a bus controller portion, a memory controller portion and a system peripheral control portion. The system peripheral control portion includes certain common peripheral devices used in the computer system C such as timers, an interrupt controller, and a DMA controller. The bus controller portion of the controller 110 controls bus cycles on the host bus 102 and the ISA bus 112. The memory controller portion provides appropriate signals to the memory 104, which preferably is made up of dynamic random access memories (DRAMs). A number of ISA slots 116 for receiving interchangeable circuit cards are present on the ISA bus 112.

Appropriate buffer and transceiver logic 120 is connected between the ISA bus 112 and an X bus 122, which forms an additional input/output (I/O) bus in the computer system C. A read-only memory or ROM 124, which contains the instructions forming the BIOS and other fundamental operations, is connected to the X bus 122. A combo peripheral chip 126 is also connected to the X bus 122. The combo peripheral chip 126 includes a keyboard controller to receive keyboard and pointing device inputs from a user, an interface for connection to parallel and serial ports 130 to provide for certain I/O capabilities, and a hard disk controller for interfacing to a hard disk drive 128. The combo peripheral chip 136 also includes a real-time clock (RTC) and basic and extended CMOS memory. The RTC provides various real-time clock functions, and the CMOS memory provides storage for various system configuration information. Additionally, a floppy disk controller 132 is connected to the X bus 122. The floppy disk controller 132 acts as an interface between the X bus 122 and a floppy disk drive 134.

A power supply circuit 136 is also located in the computer system C. The outputs provided by the power supply circuit 136 include a 12-volt supply signal +12 V, a 5-volt supply signal +5 V, and the supply signal PVDD, which varies between 3.3 volts and 5 volts depending on the type of the CPU 101 used. The voltage detect sense pin VOLDET is provided to the power supply circuit 136. The power supply signal PVDD is provided to the CPU 101, and in accordance with the present invention, is automatically set at 3.3 volts or 5 volts depending on the state of the pin VOLDET.

Figure 2:
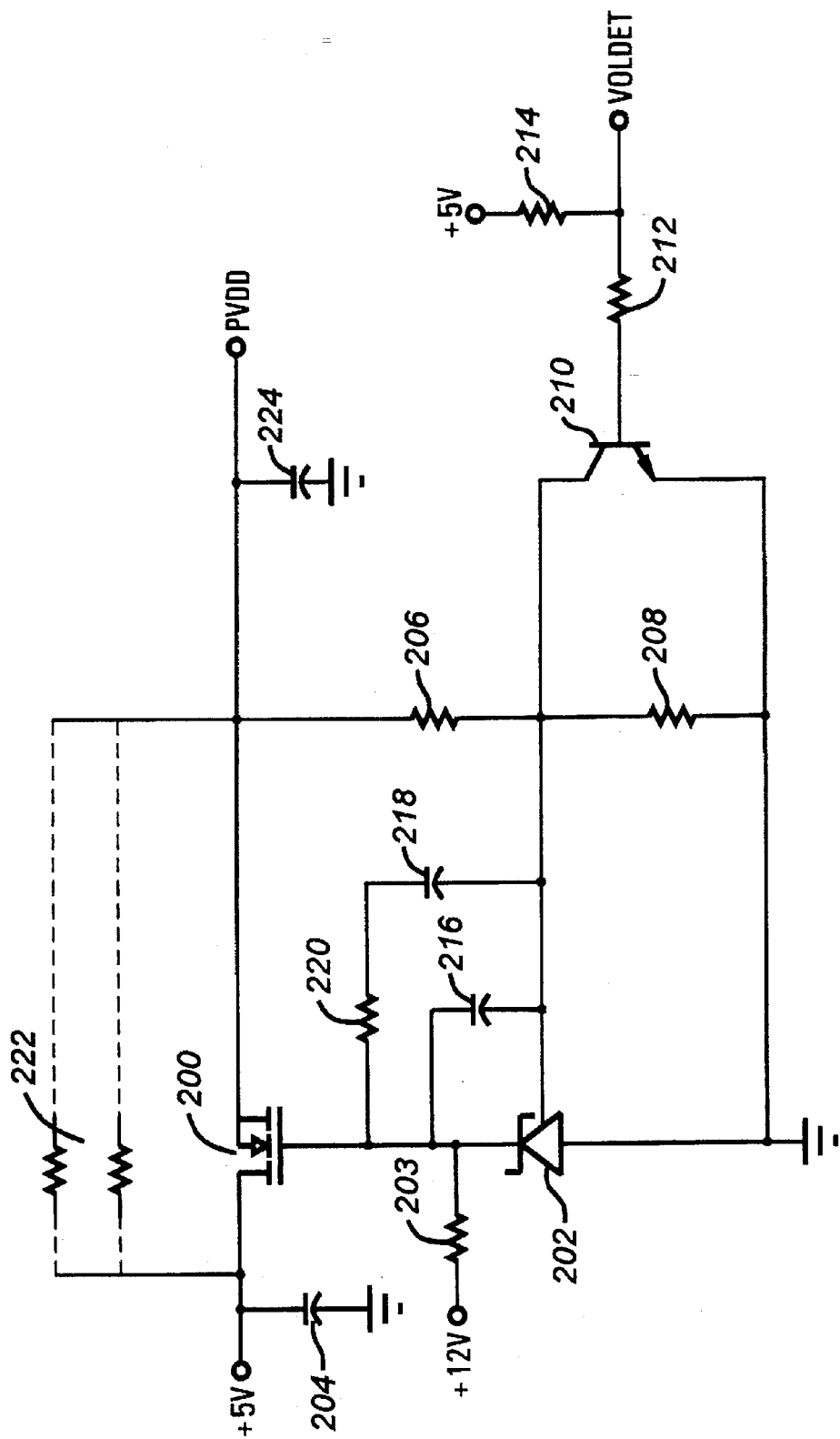
FIG. 2 is a schematic diagram of portions of the power supply control circuit of Figure I that regulates the voltage provided to a microprocessor in the computer system.

Referring now to FIG. 2, regulator circuitry in the power supply circuit 136 for generating the supply signal PVDD is shown. The regulator circuitry includes a power n-channel enhancement field effect transistor (FET) 200, whose drain is connected to the supply signal +5 V and whose source is connected to the supply signal PVDD. A decoupling capacitor 204 is connected between the drain of the power FET 200 and ground to remove high frequency noise. Decoupling and bulk capacitors 224 are connected to the supply signal PVDD to maintain the voltage level at PVDD stable. The gate of the power FET 200 is connected to the output pin of a voltage reference source 202. Any one of the standard voltage reference source chips generally available can be used, provided that the reference voltage is as described below, though the TL431 is preferred. The gate of the power FET 200 is also coupled to the supply signal +12 V through a resistor 203. The reference input of the voltage reference source 202 is connected to the collector of a bipolar junction transistor (BJT) 210, and the ground pin of the voltage reference source 202 is connected to ground. The emitter of the BJT 210 is connected to ground and its base is coupled to the voltage detect sense pin VOLDET through a resistor 212. A pullup resistor 214 is connected between the voltage detect sense pin VOLDET and the supply signal +5 V. When a 5-volt CPU 101 is placed into the socket 100, the sense pin VOLDET is left floating. As a result, the pullup resistor 214 is able to pull the sense pin VOLDET to 5 volts. If a 3.3-volt CPU 101 is inserted into the socket 100, then the sense pin VOLDET is driven low by the CPU 101.

A resistor 206 is connected between the source of the power FET 200 and the collector of the BJT 210. Another resistor 208 is connected between the collector of the BJT 210 and ground. The resistors 206 and 208 form a voltage divider circuit to provide a voltage at their common node based on the voltage of the supply signal PVDD. In addition, a capacitor 216 is connected between the output pin and the reference pin of the reference voltage source 202. One side of a resistor 220 is also connected to the output pin of the voltage reference source 202, and the other side of the resistor 220 is connected to one side of a capacitor 218. The other side of the capacitor 218 is connected to the reference pin of the voltage reference source 202. The capacitors 216 and 218 and the resistor 220 function to stabilize the voltage generated on the output pin of the voltage reference source 202. Any noise glitch occurring on the reference pin of the voltage reference source 202 is filtered by the combination of the resistor 220 and the capacitors 216 and 218.

If the sense pin VOLDET is pulled high by the resistor 214, the BJT 210 is turned on, thereby pulling the reference pin of the voltage reference source 202 to approximately the collector-to-emitter saturation voltage of the BJT 210, which is approximately 0.2 to 0.3 volts. This turns the voltage reference source 202 off, which allows the supply signal +12 V to drive the gate of the power FET 200 to approximately 12 volts. As a result, the voltage of the supply signal +5 V completely passes through the power FET 200 to drive the supply signal PVDD to 5 volts.

If a 3.3-volt CPU 101 is installed and the sense pin VOLDET is driven low, the BJT 210 is turned off. As a result, the voltage provided to the reference pin of the voltage reference source 202 is developed by the voltage divider formed from the resistors 206 and 208. The voltage at the reference pin of the voltage reference source 202 is thus dependent upon the power supply voltage PVDD. At steady state, the voltage at the reference pin of the voltage reference source 202 is driven to about 2.5 volts. In response to this voltage, the voltage reference source 202 drives the gate of the power FET 200 to approximately one threshold voltage ($V_T$) above 3.3 volts. The threshold voltage $V_T$ of the power FET 200 ranges from 3 to 10 volts. Consequently, due to the gate-to-source threshold voltage V of the power FET 200, the voltage at the source of the power FET 200 is limited to approximately 3.3 volts. A feedback path exists from the regulated supply signal PVDD through the resistor 206 to the reference pin of the voltage reference source 202, which allows the supply signal PVDD to be maintained at a relatively stable 3.3 volts.

Optional zero ohm resistors 222 are inserted between the supply signal +5 V and the supply signal PVDD when the power FET 200 and all its associated circuitry are not installed. When optional resistors 222 are used instead of the power FET 200, the computer system C can be used only with 5-volt microprocessors.

Thus, a circuit has been described that automatically switches the power supply voltage provided to a CPU, referred to as supply signal PVDD, between 3.3 volts and 5 volts. The circuit detects whether the CPU installed in a socket is a 3.3-volt part or a 5-volt part by determining the state of a voltage detect sense pin provided by the socket. If the voltage detect sense pin is driven low, that indicates a 3.3-volt CPU is being used. If a 5-volt CPU is installed, the voltage detect sense pin is left floating by the CPU, which allows a pullup resistor to pull the voltage detect sense pin high. The power supply voltage provided to the CPU is regulated through a power field effect transistor (FET). The gate of the power FET is connected to the output of a voltage reference source and is coupled to a 12-volt supply signal. If the voltage detect sense pin is pulled high, the voltage reference source is turned off, allowing the 12-volt supply signal to drive the gate of the power FET. This in turn allows the power FET to pass a 5-volt supply signal to the CPU supply signal PVDD. If the voltage detect sense pin is pulled low, the voltage reference source is turned on to drive the gate of the power FET to approximately one threshold voltage above 3.3 volts. In response, the power FET passes only 3.3 volts to the CPU supply signal PVDD.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A circuit for automatically switching a power supply voltage provided to a microprocessor used in a computer system between a first voltage and a second voltage, said first voltage being greater than said second voltage, wherein the computer system includes a power supply having a first power supply output providing the first voltage, and wherein the microprocessor provides a voltage detect sense signal pin for indicating whether the microprocessor requires the power supply voltage at the first voltage or the second voltage, the voltage detect sense signal being at a first state to indicate the first voltage, and the voltage detect sense signal being at a second state to indicate the second voltage, the circuit comprising:

a feedback circuit responsive to the voltage detect sense signal and providing an output signal, said output signal being driven to a third voltage if the voltage detect sense signal is at the first state, and said output signal being driven to a fourth voltage if the voltage detect sense signal is at the second state; and a field effect transistor having a gate driven by said output signal, a drain connected to the first power supply output, and a source coupled to a microprocessor power supply voltage pin wherein the field effect transistor drives the microprocessor power supply voltage to the first voltage if said output signal is at said third voltage and to the second voltage if said output signal is at said fourth voltage.

2. The circuit of claim 1, wherein said field effect transistor has a threshold voltage, wherein said third voltage is approximately one threshold voltage greater than said first voltage, and wherein said fourth voltage is approximately one threshold voltage greater than said second voltage.

3. The circuit of claim 2, wherein said first voltage is approximately 5 volts and said second voltage is approximately 3.3 volts.

4. The circuit of claim 2, wherein said feedback circuit includes:

a voltage reference source having an output pin and a reference pin, said output pin providing said output signal; and a driver circuit responsive to said voltage detect sense signal and coupled to said reference pin for driving said reference pin to a predetermined voltage if the voltage detect sense signal is at the second state, wherein said reference pin being at said predetermined voltage causes said voltage reference source to drive said output signal to said fourth voltage.

5. The circuit of claim 4, wherein the power supply includes a second computer system power supply output providing a second power supply voltage, and wherein said feedback circuit further includes:

a first resistor connected between said output pin of said voltage reference source and said second computer system power supply output, wherein said driver circuit drives said reference pin to turn off said voltage reference source if the voltage detect sense signal is at the first state, and wherein said second computer system power supply voltage drives said output signal to said third voltage through said first resistor if said voltage reference source is turned off.

6. The circuit of claim 5, wherein said driver circuit includes:

a second resistor connected between the microprocessor power supply voltage pin and said reference pin;

a third resistor connected between said reference pin and a ground plane; and a transistor connected to said reference pin and coupled to the voltage detect sense signal pin, said transistor driving said reference pin low if the voltage detect sense signal is at the first state, said transistor being turned off if the voltage detect sense signal is at the second state, wherein said third resistor has a resistance in proportion to said second resistor to provide a voltage at said reference pin such that said output pin is driven to said fourth voltage when said transistor is turned off.

7. The circuit of claim 6, wherein said transistor is a bipolar junction transistor having a collector connected to said reference pin, a base coupled to said voltage detect sense signal pin, and an emitter connected to said ground plane.

8. The circuit of claim 7, wherein said first voltage is approximately 5 volts and said second voltage is approximately 3.3 volts.

9. The circuit of claim 1, wherein the microprocessor drives the voltage detect sense signal low to indicate that the microprocessor requires the microprocessor power supply signal at the second voltage, and wherein the microprocessor leaves the voltage detect sense signal undriven to indicate that the microprocessor requires the microprocessor power supply signal at the first voltage, the circuit further comprising:

a pullup resistor connected to the voltage detect sense signal pin for pulling the voltage detect sense signal high if the voltage detect sense signal is undriven by the microprocessor.

10. A computer system, comprising:

a socket having a voltage detect sense pin and a power supply pin;

a microprocessor having a plurality of pins for insertion into said socket, one of said microprocessor pins being connected to said voltage detect sense pin and another of said microprocessor pins being connected to said power supply pin, wherein said microprocessor drives said voltage detect sense pin to a first state if said microprocessor requires said power supply pin to be driven to a first voltage, and wherein said microprocessor drives said voltage detect sense pin to a second state if said microprocessor requires said power supply pin to be driven to a second voltage, said first voltage being greater than said second voltage;

a power supply having a first power supply output for providing said first voltage; and a circuit coupled to said power supply and said socket for automatically switching said power supply pin between said first voltage and said second voltage, including:

a feedback circuit coupled to said voltage detect sense pin for providing an output signal, said output signal being driven to a third voltage if said voltage detect sense pin is at said first state, and said output signal being driven to a fourth voltage if said voltage detect sense pin is at said second state; and a field effect transistor having a gate driven by said output signal, a drain connected to said first power supply output, and a source coupled to said power supply pin, wherein said field effect transistor drives said power supply pin to said first voltage if said output signal is at said third voltage and to said second voltage if said output signal is at said fourth voltage.

11. The computer system of claim 10, wherein said field effect transistor has a threshold voltage, wherein said third voltage is approximately one threshold voltage greater than said first voltage, and wherein said fourth voltage is approximately one threshold voltage greater than said second voltage.

12. The computer system of claim 11, wherein said first voltage is approximately 5 volts and said second voltage is approximately 3.3 volts.

13. The computer system of claim 11, wherein said feedback circuit includes:

a voltage reference source having an output pin and a reference pin, said output pin providing said output signal; and a driver circuit coupled to said voltage detect sense pin and coupled to said reference pin for driving said reference pin to a predetermined voltage if said voltage detect sense pin is at said second state, wherein said reference pin being at said predetermined voltage causes said voltage reference source to drive said output signal to said fourth voltage.

14. The computer system of claim 13, wherein said power supply provides a second computer system power supply output providing a second power supply voltage, and wherein said feedback circuit further includes:

a first resistor connected between said output pin of said voltage reference source and said second computer system power supply output, wherein said driver circuit drives said reference pin to turn off said voltage reference source if the voltage detect sense signal is at said first state, and wherein said second computer system power supply voltage drives said output signal to said third voltage through said first resistor if said voltage reference source is turned off.

15. The computer system of claim 14, wherein said driver circuit includes:

a second resistor connected between said source of said field effect transistor and said reference pin;

a third resistor connected between said reference pin and a ground and a transistor connected to said reference pin and coupled to said voltage detect sense pin, said transistor driving said reference pin low if said voltage detect sense pin is at said first state, said transistor being turned off if said voltage detect sense pin is at said second state, wherein said third resistor has a resistance in proportion to said second resistor to provide a voltage at said reference pin such that said output pin is driven to said fourth voltage when said transistor is turned off.

16. The computer system of claim 15, wherein said transistor is a bipolar junction transistor having a collector connected to said reference pin, a base coupled to said voltage detect sense pin, and an emitter connected to said ground plane.

17. The computer system of claim 16, wherein said first voltage is approximately 5 volts and said second voltage is approximately 3.3 volts.

18. The computer system of claim 10, wherein said microprocessor drives said voltage detect sense pin low to indicate that said microprocessor requires said power supply pin to be driven at said second voltage, and wherein said microprocessor leaves said voltage detect sense pin undriven to indicate that said microprocessor requires said power supply pin to be driven at said first voltage, said circuit further comprising:

a pullup resistor connected to said voltage detect sense pin for pulling said voltage detect sense pin high if said voltage detect sense pin is undriven by said microprocessor.

* * * * *

UNITED STATES PATENT AND TRADEMARK OFFICE
CERTIFICATE OF CORRECTION

PATENT NO. : 5,632,039
DATED     : May 20, 1997
INVENTOR(S) : Richard E. Walker and Kurtis J. Bowman It is certified that error appears in the above-identified patent and that said Letters Patent is hereby corrected as shown below:

In column 5, line 35, claim 1, please delete "signal".

In column 5, line 36, claim 1, please insert --communicating a voltage detect sense signal-- after "for".

In column 5, line 51, claim 1, please delete "voltage".

In column 6, line 24, claim 6, please delete "voltage".

In column 6, line 28, claim 6, please delete "signal".

In column 6, line 40, claim 7, please delete "signal".

In column 6, line 54, claim 9, please delete "signal".

In column 6, lines 58 and 59, claim 10, please delete "a socket having a voltage detect sense pin and a power supply pin;".

In column 6, line 60, claim 10, please replace "plurality of pins for insertion into said socket, one of said microprocessor pins being connected to said voltage detect sense pin and another of said microprocessor pins being connected to said power supply pin," with --voltage detect sense pin and a power supply pin,--.

Signed and Sealed this

Sixth Day of October, 1998

*Attest:*

BRUCE LEHMAN

*Attesting Officer*   Commissioner of Patents and Trademarks